United States Patent [19]

Sakata et al.

[11] Patent Number: 5,032,471
[45] Date of Patent: Jul. 16, 1991

[54] PYROELECTRIC CERAMIC COMPOSITION AND MULTILAYERED STRUCTURE THEREFROM

[75] Inventors: Kouichirou Sakata, Nagareyana; Tadashi Takenaka, Kashiwa; Tamotsu Ueyama, Oyama; Mikiya Ono, Tokorozawa, all of Japan

[73] Assignee: Mitsubishi Mining and Cement Co. Ltd., Tokyo, Japan

[21] Appl. No.: 551,783

[22] Filed: Jul. 12, 1990

Related U.S. Application Data

[62] Division of Ser. No. 498,544, Mar. 26, 1990.

[30] Foreign Application Priority Data

| | | | |
|---|---|---|---|
| Mar. 24, 1989 | [JP] | Japan | 1-70473 |
| Mar. 28, 1989 | [JP] | Japan | 1-73800 |
| Mar. 31, 1989 | [JP] | Japan | 1-78191 |

[51] Int. Cl.$^5$ ............................................. B32B 9/00
[52] U.S. Cl. .................................... 428/699; 428/701; 501/134
[58] Field of Search ............... 428/699, 701; 501/134; 252/62.9

[56] References Cited

FOREIGN PATENT DOCUMENTS 45-26146  8/1970  Japan ................................. 252/62.9
47-40759  10/1972  Japan ................................. 252/62.9

Primary Examiner—Mark L. Bell
Assistant Examiner—Deborah Jones
Attorney, Agent, or Firm—Hoffman, Wasson & Gitler

[57] ABSTRACT

A pyroelectric ceramic composition of the general formula: $PbZr_X(Zn_{1/3}Nb_{2/3})_YTi_ZO_3$ wherein $X+Y+Z=1$ is provided having both of high pyroelectric constant and the second transition temperature below its Curie's temperature. Further, there is provided a multilayered pyroelectric structure comprising a stack of a plurality of layers, each of which has the different composition each to other, of the general formula: $PbZr_X(Zn_{1/3}Nb_{2/3})_YTi_ZO_3$ wherein $X+Y+Z=1$, where the value of Z is different from each other in the different layers.

3 Claims, 7 Drawing Sheets

THE SECOND TRANSITION
TEMPERATURE AND
VALUE Z

PYROELECTRIC CERAMIC COMPOSITION AND MULTILAYERED STRUCTURE THEREFROM

This is a divisional of copending application Ser. No. 07/498,544 filed on Mar. 26, 1990.

FIELD OF THE INVENTION

The present invention relates to a specific pyroelectric (piezoelectric) ceramic composition. Particularly, it relates to the pyroelectric composition having high pyroelectric constant, and a second transition temperature below its Curie's temperature.

DESCRIPTION OF THE PRIOR ART

There have been many proposals of utilizing an heat radiation such as infra red radiation emitted from a material, and detecting the temperature of the material by not-contacting, to produce a temperature sensor. Then, the demand for such sensor has been advanced.

A temperature sensor by using a pyroelectric material is one of such sensors. The pyroelectric temperature sensor has the following features: 1) usable in a room temperature, 2) independence of wavelength of detecting radiation, 3) unnecessity of light source such as a photocell and a phototube, 4) detectable apart from the material to be measured without any attachment. Therefore, such pyroelectric temperature sensor becomes recently of significant interest.

Such sensor has been desired to be developed for a wide variety of the applications of fields including 1) accident prevention such as invasion detector and fire detector, 2) automatic opening and closing system for a door, a curtain and a shutter, 3) automatic lighting on and off system, 4) detection of vehicles passing by, 5) non-contacting temperature detector used in electric cooking range and a laser power meter, 6) pyrovision.

However, the demands to save energy and material become higher, and therefore, the detection of the temperature at the position apart from the detector i.e. non-contanct measurement is desired and needed. Therefore, the pyroelectric material evidencing high performance and high quality is strongly desired.

A variety of the pyroelectric materials are known having the physical constants and properties as shown in Table 1. Table 1. from "Electronics ceramics, autumn edition of 1981 published by Gakken-Sha, page 57.

temperature, and maximizes at the Curie's point. Further, the pyroelectric constant will be lowered to zero with increase of the temperature above Curie's point.

The instrinsic polarization will decrease with increase of the temperature, and will be approximately zero above Curie's point. The dielectric constant has the general tendency similar to that of the pyroelectric constant, and maximizes at Curie's point.

The prior art pyroelectric materials are explained as follows; Tri-glycine sulphate crystal (TGS) has a) relatively significant performance in the properties such as a pyroelectric constant (P), a dielectric constant ($\epsilon_r$), volume specific heat ($C_v$), b) absorption of the radiation above 2 micron wavelength, c) relatively easy to be fabricated. However, TGS is a) water soluble crystal, b) costly preparation, c) its Curie's point being present in a lower temperature, i.e. at 49° C., and therefore, is not practical As a practical and commercialized pyroelectric material, crystalline material such as $LiTaO_3$, $LiNbO_3$, and $Sr_{1-x}Ba_xNb_6O_{15}$ can be listed. Particularly, $LiTaO_3$ and $LiNbO_3$ have relatively high Curie's point, and does not have the shortcomings of TGS, and has relatively low dielectric constant and therefore, stable performance near to the transition temperature. Because of crystalline material, those materials can be obtained with high reproducibility.

Such crystals have the shortcomings as follows; a) costly preparation because of Czochralski method for crystal growth, b) large scale of crystal can not be prepared, c) pyroelectric constant is low in the other range than Curie's point range, therefore, the sensitivity will be unacceptably low when the area of the detector is small.

On the other hand, ceramics such as $PbTiO_3$ and $PbTiO_3-PbZrO_3$ solid solution are typical pyroelectric ceramics, and have high Curie's point, high intrinsic polarization, and relatively low dielectric constant (e.g. about 200 to 450). However, the pyroelectric constant of $PbTiO_3$ is about $2 \times 10^{-8}/°C./cm^2$ and therefore, is of low value, and then, has the shortcoming of having no high sensitivity. PZT ceramics has relatively high dielectric constant such as 800 to 1,000, which will lower the sensitivity.

The fundamental requirements for the conventional pyroelectric material are as follows; 1) high pyroelectric constant, 2) detectivity on a target, (the value corresponding to S/N). However, in the conventional pyroelectric material, the characteristics thereof will significantly change when the temperature to be measured is changed. Therefore, the device using the conventional pyroelectric material would not be adopted to a changing circumstance in which the temperature is naturally

| Material | pyroelectric Constant $P(10^{-8}/C/cmK)$ | dielectric constant $\epsilon_r$ | Curie' point $T_c(°C.)$ | Properties | | |
|---|---|---|---|---|---|---|
| | | | | FM 10Ccm/J | FMi 10Ccm/J | $FM_D$ 10Ccm/J |
| TGS | 4.0 | 35 | 49 | 4.6 | 1.6 | 2.7 |
| $LiTaO_3$ | 2.3 | 54 | 618 | 1.35 | 0.72 | 0.98 |
| $PbTiO_3$ | 2.0 | 200 | 470 | 0.93 | 1.9 | 1.3 |
| $Sr_{48}Ta_{52}Nb_2O_3$ | 6.5 | 385 | 115 | 0.81 | 3.1 | 1.6 |
| $BaTiO_3$ | 1.9 | 1,350 | 120 | 0.47 | 0.63 | 0.55 |
| PLZT6.5/65/35 | 10.0 | 1,400 | 164 | 0.23 | 3.9 | 1.0 |
| PZT-4 | 3.5 | 1,400 | 328 | 0.087 | 1.2 | 0.33 |

Where $FM_v = P/S*\epsilon_r$, $FM_i = P/S$, $FM_D = P/S*(\epsilon_r*tan\delta)^{\frac{1}{2}}$, S is a heat capacity, P is a pyroelectric constant, $\epsilon_r$ is dielectric constant and $tan\delta$ is dielectric loss.

The pyroelectric materials shown in Table 1 are known as having the characteristics as shown in Table 1, i.e. intrinsic polarization, pyroelectric constant, and dielectric constant against the temperature.

In general speaking, a pyroelectric constant is lower at a temperature range approximate to the room temperature, and increases drastically near to the Curie's changed in variety of range, and therefore is not practical under a variety of circumstances.

Generally speaking, the pyroelectric material has a Curie's point, and has a higher pyroelectric constant at the Curie's point. Further, an ordinary pyroelectric ceramic material has a drastic increase of dielectric constant at the Curie's point range, and therefore, the performance on the sensitivity is significantly changed against the change of the circumstance temperature, and then, the stability is lowered.

At the temperature range higher than Curie's point, polarization will be disappeared so that the pyroelectric coefficient will be zero. Accordingly, the temperature range in which the pyroelectricity (pyroelectric performance) can be utilized to measure the temperature should be the range of 100° C. or more lower than Curie's point. However, the pyroelectric coefficient of the known pyroelectric ceramics may be at highest $5 \times 10^{-8}/°$ C./cm$^2$ or less in the above mentioned range. PLZT has the pyroelectric coefficient of $10 \times 10^{-8}/°$ C./cm$^2$ but the dielectric constant of 1,000 to 1,400, and therefore, the performance, e.g. the sensitivity to the voltage is significantly low.

Further, PZT composition having the ratio of Pb:Zr:Ti=96:4 to 70:30 has been recently studied in order to improve the pyroelectric performance. It have been found that this composition has the second transition temperature at the temperature range of 40° C. to 110° C., at the transition temperature of which the ferroelectric crystal phase transforms into the other ferroelectric crystal phase, and the pyroelectric coefficient corresponding to the composition has the maximum value at this second transition temperature. However, the PZT composition has the shortcomings in that when the second transition temperature is changed to be higher, the pyroelectric coefficient is changed to be lower, and further, the sensitivity to the temperature is lower. The further shortcoming is that the dielectric constant becomes higher as well as the sensitivity becomes lower, and the performance can not be increased.

SUMMARY OF THE INVENTION

With the foregoing considerations in mind, the present invention contemplates the provision of the new pyroelectric ceramic composition to conquer the shortcomings of the prior art pyroelectric material.

It is an object of the present invention to provide a pyroelectric composition having 1) low dielectric constant in the specific temperature range of minus 10° C. to 110° C., 2) high pyroelectric coefficient P, 3) high performance, e.g. high sensitivity, 4) stable pyroelectric properties in the temperature range of minus 10° C. to 110° C.

It is another object of the present invention to provide a pyroelectric ceramic structure comprising multiple layers of pyroelectric compositions having the stability of the pyroelectric performance.

It is further object of the present invention to provide the ceramic pyroelectric multilayered structure comprising stack of different composition layers, having the total performance of the combination of the discrete pyroelectric sheets.

DETAILED DESCRIPTION OF PREFERRED EMBODIMENTS

Figure 1:
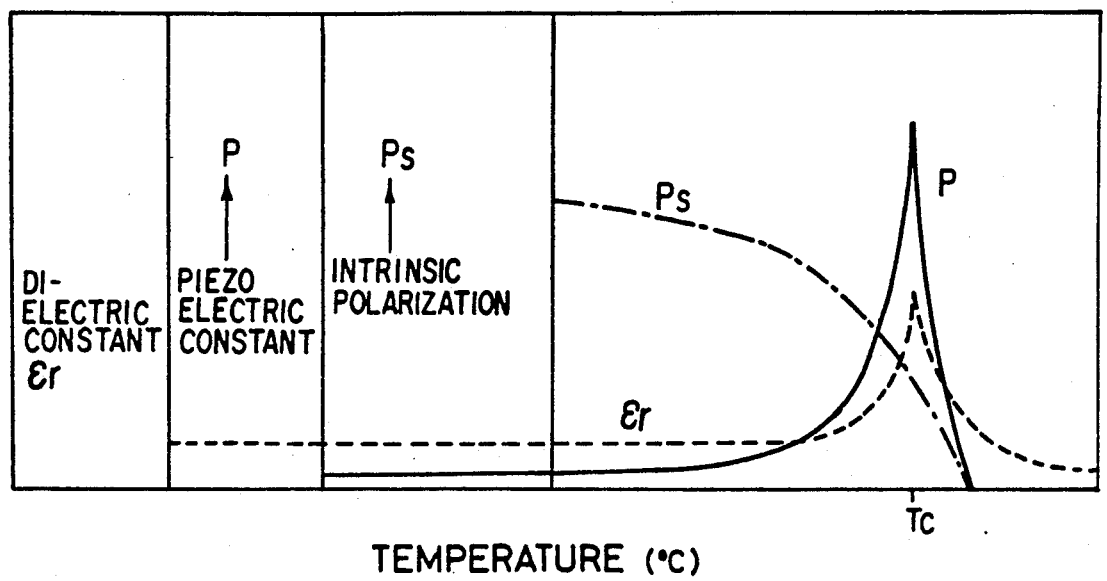
FIG. 1 is a graph showing the general tendencies of intrinsic polarization $P_s$, pyroelectric constant P, and dielectric constant $\epsilon$, changes against the temperature.

It is believed from the previous study of the prior art pyroelectric composition that PbZrO$_3$ is a typical antiferroelectrics and involves a number of near free energy levels present in the energy structure, and therefore, the inventors have studied a variety of this kind of the compositions and found that a small amount of modifier can change the stabilities of a variety of characteristics and the various phases are appearing.

Then, they believed that the composition in the neighborhood of PbZrO$_3$ might have remarkable performance, and studied the phase diagram and physical properties of the composition neighbor to PbZrO$_3$. As a result, they have found that a solid solution of PbZrO$_3$ and Pb(Zn$_{\frac{1}{3}}$Nb$_{\frac{2}{3}}$)O$_3$, that is, PbZr$_x$(Zn$_{\frac{1}{3}}$Nb$_{\frac{2}{3}}$)$_{1-x}$O$_3$ has the second transition temperature at which a ferroelectric crystal phase transforms into the other ferroelectric crystal phase, in a certain composition range, and further, it evidences remarkably high pyroelectric constant P and relatively low dielectric constant. However, they have found that the second transition temperature of the $PbZr_x(Zn_{\frac{1}{3}}Nb_{\frac{2}{3}})_{1-x}O_3$ composition disappears when the X is changed, and cannot be higher than the room temperature. Then, they have studied further a variety of modifiers to improve the pyroelectric performance, and to develop the composition having the higher pyroelectric coefficient at the higher temperature than the room temperature, and then, found that the composition of $PbZr_x(Zn_{\frac{1}{3}}Nb_{\frac{2}{3}})_yTi_zO_3$ wherein $X+Y+Z=1$, $X=0.9$ and $Y=0.1-Z$ the titanium content Z to be added to the solid solution is 0 to 10 mol percent has the second transition temperature at the wide range such as minus 10° C. to 100° C., and the dielectric constant $\epsilon_r$ is low, and the pyroelectric coefficient P is high at the transition temperature. Therefore, this kind of the composition can have high pyroelectric sensitivity and significant performance.

The inventors have found that a pyroelectric ceramic composition of the general formula: $PbZr_x(Zn_{\frac{1}{3}}Nb_{\frac{2}{3}})_yTi_zO_3$ wherein $X+Y+Z=1$, and having both of high pyroelectric constant and the second transition temperature below its Curie's temperature evidences the significant pyroelectric performance.

In the inventive pyroelectric composition, The temperature at which the pyroelectric coefficient P evidences high can be increased to the temperature higher than the room temperature by adding titanium in an amount of 0.1 mol percent to 10 mol percent, i.e. the second transition temperature $T_{c2}$ can appear over the wide range of minus 10° C. to 100° C., which is corresponding to the Ti content. The dielectric constant $\epsilon_r$ is lower (250 to 400), and the pyroelectric coefficient P is higher with less temperature dependency. Therefore, the inventive pyroelectric composition can be appropriately assembled to produce a pyroelectric infrared effective sensor.

The material of $PbZrO_3$ used in the inventive composition is a typical antiferroeletrics and involves a number of near free energy levels present in the energy structure, and therefore, the addition of the small amount of the modifier will change the stabilities of the various characteristics of the composition so as to provide various crystal phases. Then, the inventors studied detailedly the phase diagram and the physical properties of the composition in the neighborhood of $PbZrO_3$. Then, they have found that a solid solution of $PbZrO_3-Pb(Zn_{\frac{1}{3}}Nb_{\frac{2}{3}})O_3$ has the second transition temperature at the temperature of about minus 10° C., and the significantly high pyroelectric coefficient and relatively low dielectric constant $\epsilon_r$ (250 to 400) at the second transition temperature, with less temperature dependency. However, it was found that the second transition temperature of the $PbZr_x(Zn_{\frac{1}{3}}Nb_{\frac{2}{3}})_{1-x}O_3$ composition disappears when the X is changed, and cannot be higher than the room temperature.

Then, they have studied further a variety of modifiers to improve the pyroelectric performance, and to develop the composition having the higher pyroelectric coefficient at the higher temperature than the room temperature, and then, found that the composition of $PbZr_x(Zn_{\frac{1}{3}}Nb_{\frac{2}{3}})_yTi_zO_3$ wherein $X+Y+Z=1$, $X=0.9$ and $Y=0.1-Z$ the titanium content Z to be added to the solid solution is 0 to 10 mol percent has the second transition temperature at the wide range such as minus 10° C., to 110° C., and the dielectric constant is low, and the pyroelectric coefficient is high at the transition temperature. Therefore, this kind of the composition can have high pyroelectric sensitivity and significant performance.

It is found that the composition of the formula $PbZr_x(Zn_{\frac{1}{3}}Nb_{\frac{2}{3}})_yTi_zO_3$ wherein $X+Y+Z=1$, has the second transition temperature appearing in the wide range of minus 10° C. to 110° C., corresponding to the content of titanium, at which transition temperature the pyroelectric sensitivity is significantly because of low dielectric constant $\epsilon_r$ and high pyroelectric constant P, and therefore the pyroelectric ceramics with high pyroelectric performance.

FIG. 1 shows the changes of the various characteristics: dielectric constant, pyroelectric constant and instrinsic polarization against the temperature, in the prior art pyroelectric material, measuring on the disc sample of the prior art composition.

Figure 2:
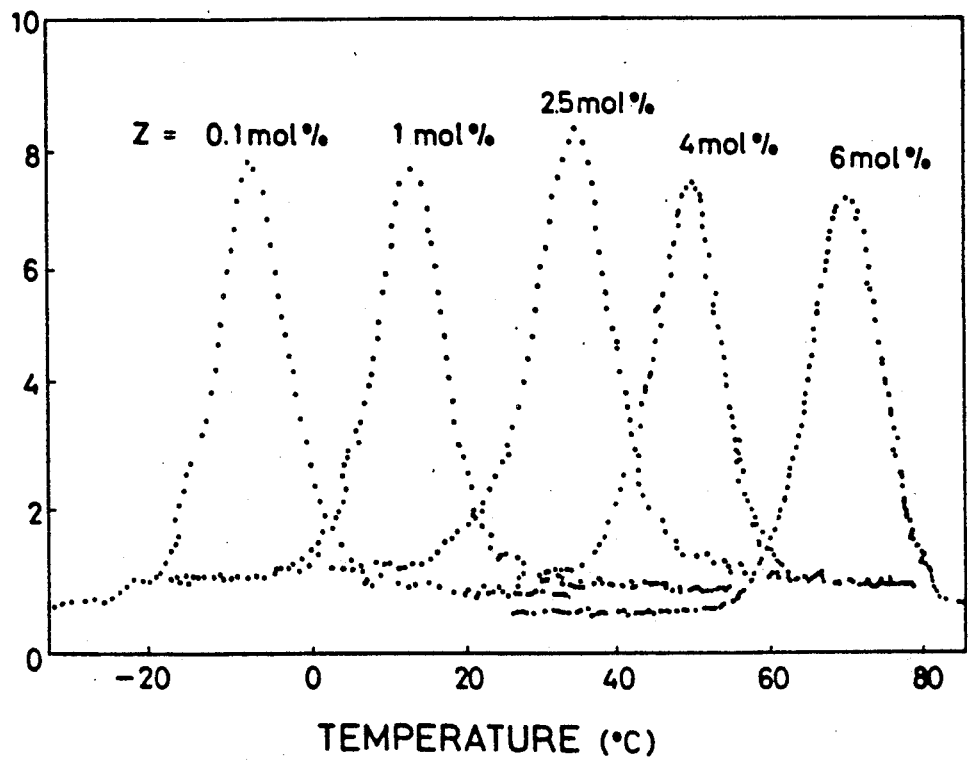
FIG. 2 is a graph showing the pyroelectric current change plotted against the temperature, in that the pyroelectric current has the maximum value near the second transition temperature in regard with the inventive pyroelectric compositions having the different content (Z) of titanium.

FIG. 2 shows the relation of the second transition temperature $T_{c2}$ and the content of titanium (Z) in the inventive pyroelectric composition.

Figure 3:
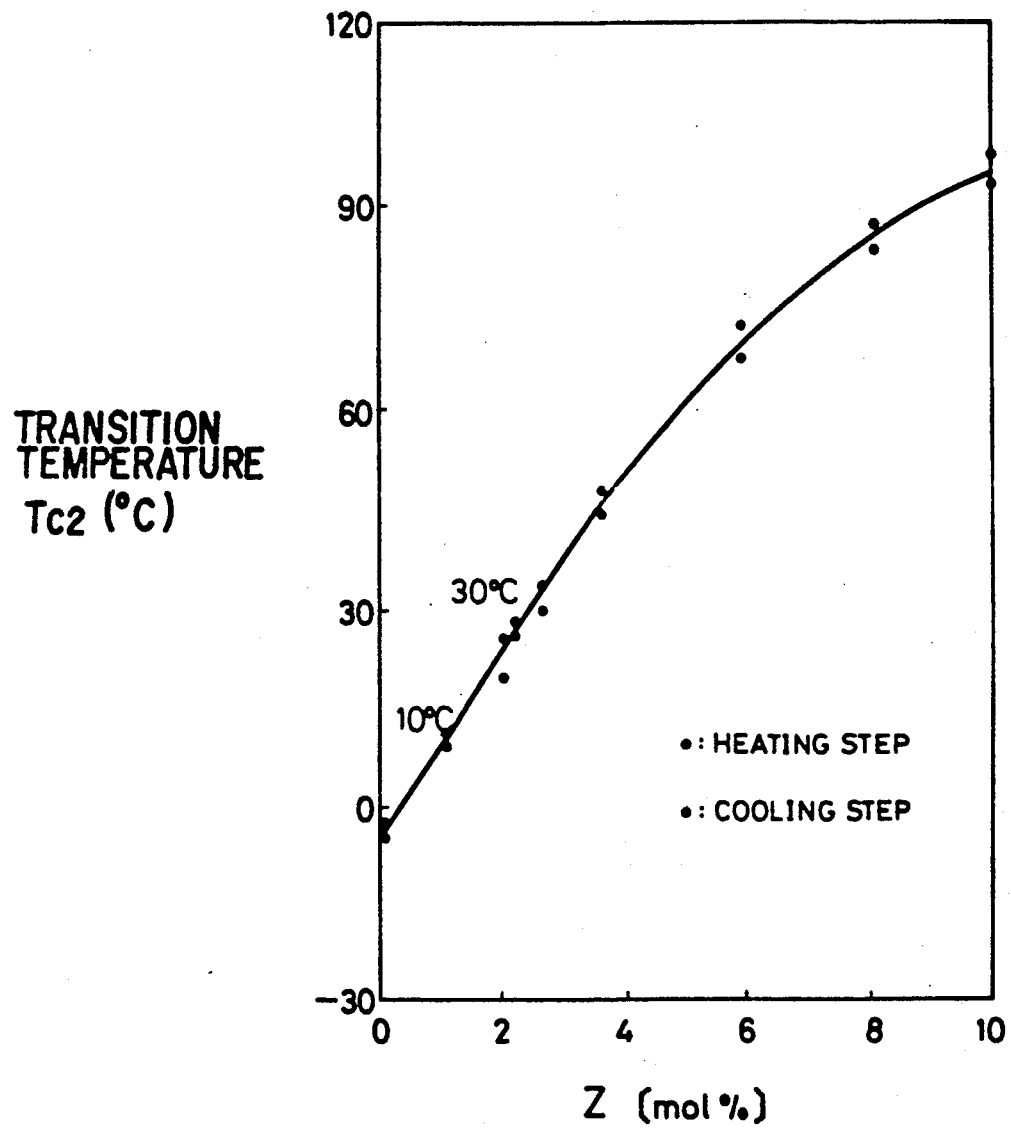
FIG. 3 is a graph showing the relation of the second transition temperature $T_{c2}$ with the content of Ti (Z value) in the inventive pyroelectric composition.

In view of FIGS. 2 and 3, the inventive pyroelectric composition has the transition temperature which is corresponding to the content or the composition, and the maximum pyroelectric current value at the transition temperature.

However, the pyroelectric current is drastically decreased at the range out of the transition temperature, therefore, it is a problem in practice of the assemble of the infrared device to detect the circumstance temperature which changes over the wide range.

The inventors have further developed to search on various compositions and the method of the preparation of the pyroelectric compounds and to find the pyroelectric compositions in which the pyroelectric performance is stable over the wide range of from the room temperature to 100° C., and the pyroelectric coefficient is converged to a certain value with the high pyroelectricity, and less temperature dependency and found that the composition of the formula $PbZr_x(Zn_{\frac{1}{3}}Nb_{\frac{2}{3}})_yTi_zO_3$ wherein $X+Y+Z=1$, has the second transition temperature over the wide range of from minus 10° C. to 100° C., with high pyroelectric performance, and further, the multilayering or stacking of such pyroelectric sheets having the different compositions each from the other, i.e. the structure comprising multiple sheets having the different pyroelectric compositions can evidence the total pyroelectric performances of the combination of those of the discrete pyroelectric compositions and the total combination of temperature-pyroelectric properties of the independent pyroelectric sheets is stable over the wide range, and the dielectric constant is 250 to 400 with high performance.

The inventive pyroelectric structure has a stack of two or more layers each of which has the different compositions of the formula: $PbZr_x(Zn_{\frac{1}{3}}Nb_{\frac{2}{3}})_yTi_zO_3$ wherein $X+Y+Z=1$, $X=0.9$ and $Y=0.1-Z$, the titanium content Z is different.

Accordingly, the starting materials are $PbZrO_3$, $Pb(Zn_{\frac{1}{3}}Nb_{\frac{2}{3}})O_3$ and $PbTiO_3$. Those materials can be prepared from each component, that is, metal inorganic salt such as oxide, carbonate, and sulphate, hydroxide, metal alkoxide and organic metal compounds, or complex oxide such as $ZrTiO_3$. Alternatively, the powders of $PbZrO_3$, $PbTiO_3$, and $Pb(Zn_{\frac{1}{3}}Nb_{\frac{2}{3}})O_3$ can be used to be mixed for the preparation of the green body in the desired ratio.

The starting materials for the preparation of the inventive pyroelectric composition can be prepared by mixing several starting materials in the predetermined ratio, firing to produce the fired powder, and then, forming a shape from the fired powder, and firing in an atmospheric pressure, and milling the fired shape to produce the starting materials for the preparation of the inventive composition. Alternatively, further the milled powder is used to form a shape, which is fired and is again milled to yield the starting powder for the inventive composition.

Such starting powder is mixed with an organic binder and plasticizer and then followed by adding a solvent, and mixing in a ball mill to yield a uniform slurry of the pyroelectric composition. Then, the slurry is cast on the surface of polyester film, and a green sheet of 0.02 mm thick is formed by using a doctor blade. The unfired, green ceramic sheet is obtained. The multiple green sheets having the different composition each to the other, are stacked by heat pressing to produce multilayered ceramic pyroelectric structure in a green state.

Figure 6:
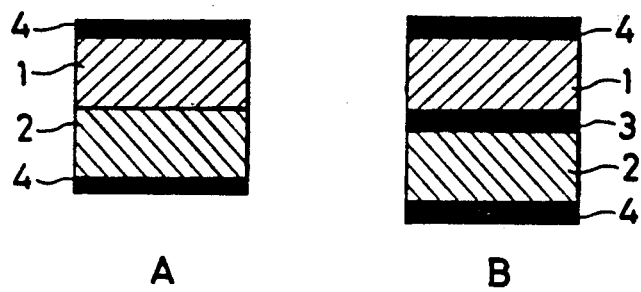
FIGS. 6 A and B show respectively two species of multilayered pyroelectric structures in accordance with the present invention.

FIGS. 6 A and B show sectional views of such multilayered pyroelectric structure.

FIG. 6 A shows a structure in which the layers 1 and 2 having the different composition are directly stacked, and fired and then the electrodes 1 are formed on the top surface and the bottom surface of the structure.

FIG. 6 B shows a structure in which the layers 1 and 2 having the different compositions are stacked by inserting the layer 3 of a platinum paste, and then the electrodes 4 are formed on the both surfaces, and fired.

The voltage of several KV/mm is applied to the resulting fired body of multilayered pyroelectric structure to yield the pyroelectric multilayered structure.

The condition for forming the multilayered structure, such as a forming temperature, and a forming pressure, and further a firing temperature, a applying voltage can be chosen appropriately based on the binder, the composition, the starting materials, and the grain size of the starting materials.

Preferably, the inventive new pyroelectric composition can be used in a variety of applications including 1) accident prevention and such invasion detector and fire detector, 2) automatic opening and closing system for a door, a curtain and a shutter, 3) automatic lighting on and off system, 4) detection of vehicles passing by, 5) non-contacting temperature detector used in electric cooking range and a laser power meter, 6) pyrovision.

The present invention is further illustrated by the following example to show manufacture of the inventive pyroelectric composition, and multilayered structure using the new composition, but should not be interpreted for the limitation of the invention.

EXAMPLE 1

Preparation of Pyroelectric Material

Powders of $PbTiO_3$, $PbZrO_3$, and $Pb(Zn_{\frac{1}{3}}Nb_{\frac{2}{3}})O_3$ having the particle size of 0.5 microns in average, and the purity of about 99.5% were used as starting materials, in the predetermined molar ratio of $PbTiO_3$, $PbZrO_3$, and $Pb(Zn_{\frac{1}{3}}Nb_{\frac{2}{3}})O_3$ which is corresponding to the predetermined composition of the formula; $PbZr_x(Zn_{\frac{1}{3}}Nb_{\frac{2}{3}})_yTi_zO_3$ and mixed in a ball mill using acetone media. Then, the mixture is put in an enameled pad, and dried thermally. The dried mixture was molded into a shape under the pressure of 600 kg/cm$^2$, then, the shaped material was calcined for one hour at 800° C., and milled to provide the powder having a particle size of below one micron.

Then, the calcined powder was molded under the pressure of 800 to 1,200 kg/cm$^2$ into a disc shape, and then the shaped disc was heated at a temperature lifting rate of 2° C./minute to a temperature of 500° C., and then maintained at this temperature for one hour, and further, the temperature was lifted at a rate of 2° C./minute to about 1,150° C., and then maintained at this temperature for two hours.

Next, the resulting calcined sample was polished into the thickness of 1 mm, and then, silver electrode was stoved on the surface of the disc at 550° C. for the measurement of pyroelectric properties. Further, the sample was polarized by applying 2 kV/mm for ten minutes.

Upon the application of potential on the sample, the pyroelectric current at 1M Hz was measured against the temperature. The result is shown in FIG. 2.

General tendencies on the pyroelectric of the prior art pyroelectric materials are shown in FIG. 1 in term of dielectric constant $\epsilon_r$, pyroelectric coefficient and intrinsic polarization.

Further, the second transition temperature $T_{c2}$ was measured against the mole ratio Z (the content of Ti) of the new composition. The result is shown in FIG. 3.

Further, potential sensitivity ($F_v$) and detectivity ($F_D$) (to S/N ratio) were measured against the Z value (the content of Ti), and further, those of the prior art materials, PZT and two species of PZT based material which are available in the market were measured and the result is shown in Table 2.

TABLE 2

| Pyroelectic Performance and Composition | | |
|---|---|---|
| | $F_V$ | $F_D$ |
| $PbZr_x(Zn_{\frac{1}{3}}Nb_{\frac{2}{3}})_yTi_zO_3$ in Z = 0.011 | 2.84 | 3.65 |
| $PbZr_x(Zn_{\frac{1}{3}}Nb_{\frac{2}{3}})_yTi_zO_3$ in Z = 0.025 | 0.65 | 0.08 |
| PZT | 0.23 | 0.65 |
| $PbZrO_3$ | 0.54 | 1.20 |
| $PbZrO_3$ | 0.30 | |

It was found from FIGS. 2 and 3 that the second transition temperature $T_{c2}$ at which the pyroelectric current is at maximum increases linearly with the increase of Z value (the content of Ti) in the formula; $PbZr_x(Zn_{\frac{1}{3}}Nb_{\frac{2}{3}})_yTi_zO_3$ in the range of minus 10° C. to 100° C..

Further, the performance of the pyroelectricity on 1) voltage sensitivity ($F_v$=pyroeletric coefficiency P/volumic specific heat $C_v$ * specific dielectric constant $\epsilon_r$) and 2) detectivity $F_o=C_v*(\epsilon_r*tan\delta)^{\frac{1}{2}}$) is about ten times of the prior art pyroelectric materials such as $PbZrO_3$ and $PbTiO_3$ as shown in Table 2.

EXAMPLE 2

Preparation of pyroelectric Material

Powders of $PbTiO_3$, $PbZrO_3$, and $Pb(Zn_{\frac{1}{3}}Nb_{\frac{2}{3}})O_3$ having the particle size of 0.5 microns in average, and the purity of about 99.5% were used as starting materials, in the predetermined molar ratio of $PbTiO_3$, $PbZrO_3$, and $Pb(Zn_{\frac{1}{3}}Nb_{\frac{2}{3}})O_3$ which is corresponding to $PbZr_x(Zn_{\frac{1}{3}}Nb_{\frac{2}{3}})_yTi_zO_3$ and mixed in a ball mill using acetone media. Then, the mixture is put in an enameled pad, and dried thermally. The dried mixture was molded into a shape under the pressure of 800 kg/cm$^2$, then, the shaped material was calcined for one hour at 800° C., and milled to provide the powder having a particle size of below 0.5 microns.

Then, the calcined powder was molded under the pressure of 800 kg/cm$^2$ into a disc shape, and then the shaped disc was heated at a temperature lifting rate of 2° C./minute to a temperature of 500° C., and then maintained at this temperature for one hour, and further, the temperature was lifted at a rate of 2° C./minute to about 1,250° C., and then maintained at this temperature for three hours so as to produce a calcined body.

Then, the calcined body was again milled in a ball mill so as to produce a starting material. Then, two or more materials of different compositions were used in combination, and mixed in acetone media, and then, molded under the pressure of 800 kg/cm$^2$ into a disc shape, and then the shaped disc was heated at a temperature of 1,250° C. for one hour.

Next, the resulting calcined sample was polished into the thickness of 1 mm, and then, silver electrode was stoved on the surface of the disc at 550° C. for the measurement of pyroelectric properties. Further, the sample was polarized by applying 3 kV/mm for ten minutes.

Each of the compositions of $PbZr_X(Zn_{\frac{1}{3}}Nb_{\frac{2}{3}})_YTi_ZO_3$ where Z is 0.1, 1.0, 2.5, 4, or 6 mol percent was fabricated and each of the fabricated pyroelectric samples was measured as mentioned above.

Upon the application of potential at 1 M Hz, the pyroelectric current was measured against the temperature. The result is shown in FIG. 4.

Figure 4:
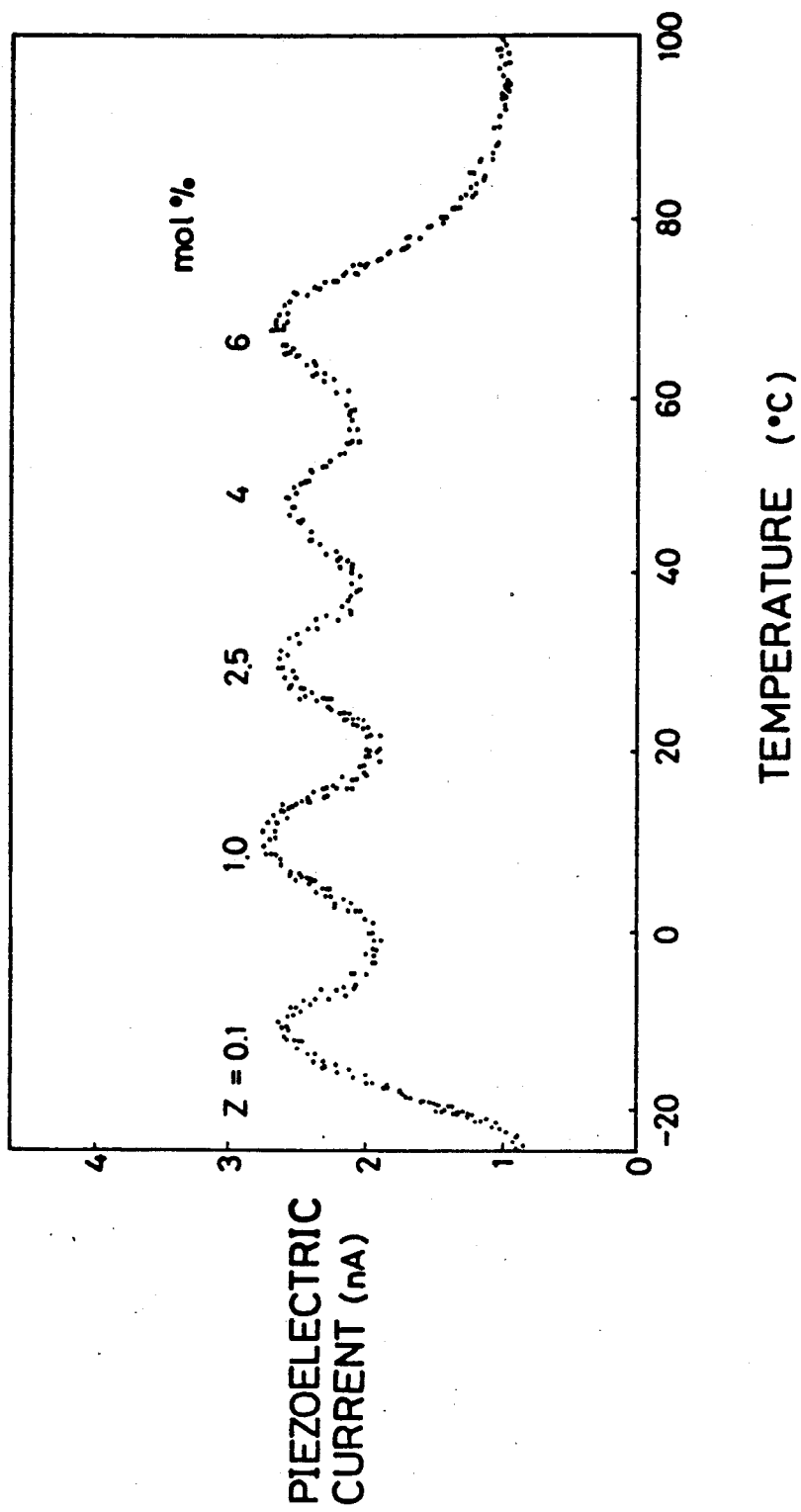
FIG. 4 is a graph showing the relation of the pyroelectric current with the temperature in the inventive composition of the general formula: PbZr$_x$(Zn$_{\frac{1}{3}}$Nb$_{\frac{2}{3}}$)$_y$Ti$_z$O$_3$ wherein X+Y+Z=1, X=0.9 and Y=0.1−Z, in that the pyroelectric currents measured in each of the compositions of the above formula when Z is 0.001, 0.01, 0.025, 0.04 and 0.06 are plotted against the temperature.

FIG. 4 reveals that the second transition temperature $T_{c\,2}$ was appearing i.e. the pyroelectric current has the maximum value at the second transition temperature. The maximum pyroelectric value was appearing in the range of minus 10° C. to 80° C., and was more than three times of that of the prior art material, i.e. more than expected value.

Figure 5:
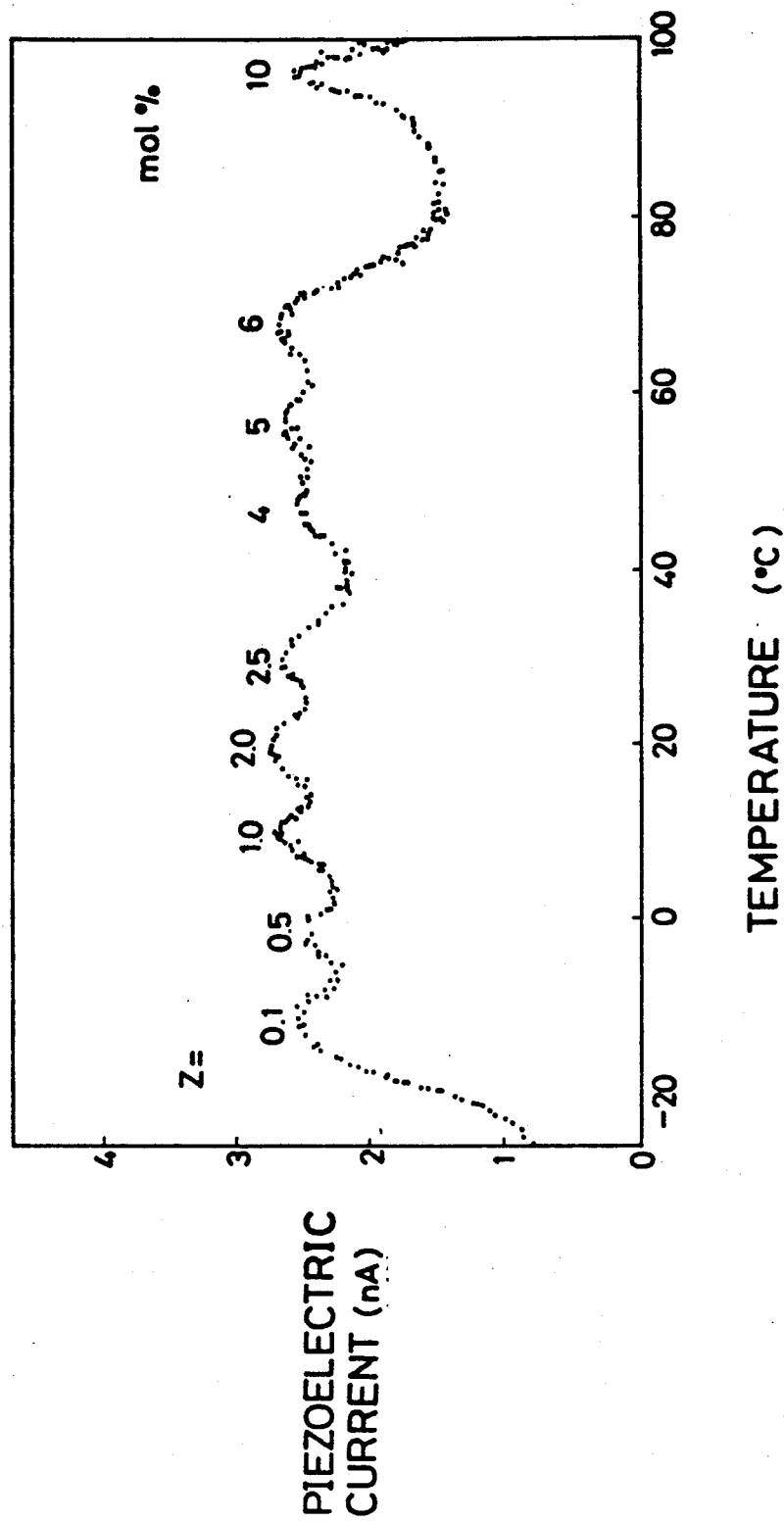
FIG. 5 is a graph showing the relation of the pyroelectric current with the temperature in the inventive composition of the general formula: PbZr$_x$(Zn$_{\frac{1}{3}}$Nb$_{\frac{2}{3}}$)$_y$Ti$_z$O$_3$ wherein X+Y+Z=1, X=0.9 and Y=0.1−Z, in that the pyroelectric currents measured in each of the compositions of the above formula when Z is 0.001, 0.005, 0.01, 0.02, 0.025, 0.04, 0.06 and 0.1 are plotted against the temperature.

Further, FIG. 5 is the result of the measurement of nine species of the new pyroelectric compositions of $PbZr_X(Zn_{\frac{1}{3}}Nb_{\frac{2}{3}})_YTi_ZO_3$ where Z is 0.1, 0.5, 1.0, 2.0, 2.5, 4, 5, 6 or 10 mol percent.

It is revealed that when the number of the species to fracture the range of the pyroelectric compositions of $PbZr_X(Zn_{\frac{1}{3}}Nb_{\frac{2}{3}})_YTi_ZO_3$ is increased, the temperature dependency of the pyroelectric current becomes wider over the range of minus 10° C. to 100° C., and the pyroelectric current becomes stabler and higher.

It is clear that when the inventive pyroelectric composition is used in an infra red ray sensor, the device can be miniaturized, and can be used over the wider range of the measuring temperature, with high sensitivity.

EXAMPLE 3

Preparation of Multilayered pyroelectric Structure

Comparison of Multilayered Structure with Single Material

Powders of $PbTiO_3$, $PbZrO_3$, and $Pb(Zn_{\frac{1}{3}}Nb_{\frac{2}{3}})O_3$ having the particle size of 0.5 microns in average, and the purity of about 99.5% were used as starting materials, in the predetermined molar ratio of $PbTiO_3$, $PbZrO_3$, and $Pb(Zn_{\frac{1}{3}}Nb_{\frac{2}{3}})O_3$ which is corresponding to $PbZr_X(Zn_{\frac{1}{3}}Nb_{\frac{2}{3}})_YTi_ZO_3$ and mixed in a ball mill using acetone media. Then, the mixture is put in an enameled pad, and dried thermally. The dried mixture was molded into a shape under the pressure of 800 kg/cm$^2$, then, the shaped material was calcined for one hour at 800° C., and milled to provide the powder having a particle size of below 0.5 microns.

Then, the calcined powder was molded under the pressure of 800 kg/cm$^2$ into a disc shape, and then the shaped disc was heated at a temperature lifting rate of 2° C./minute to a temperature of 500° C., and then maintained at this temperature for one hour, and further, the temperature was lifted at a rate of 2° C./minute to the temperature of about 1,250° C., and then maintained at this temperature for three hours so as to produce a calcined body.

Then, the calcined body was again milled in a ball mill so as to produce a starting material. Then, two or more materials of different compositions of the calcined powder were used in combination, and mixed with a binder of poly methyl methacrylate, and a plasticizer of dibutyl phthalate in a ratio of the powder: the binder: the plasticizer being 100:6:3 in weight in a media of methyl ethyl ketone in a ball mill, and milled for 24 hours, so to produce the slurry of the predetermined composition.

Then, the slurry was used to form a green sheet having 0.015 mm of thickness. The green sheets of predetermined different compositions were formed. The predetermined compositions were respectively corresponding to the compositions of the formula; $PbZr_X(Zn_{\frac{1}{3}}Nb_{\frac{2}{3}})_YTi_ZO_3$ wherein $X+Y+Z=1$, and $X=0.9$, and $Y=0.1-Z$, and when Z is 0.001, 0.01, 0.025, 0.04, 0.06 or 0.1 (which corresponds respectively to each 0.1 mol percent, 1 mol percent, 2.5 mol percent, 4 mol percent, 6 mol percent, and 10 mol percent.)

Next, the above-mentioned six species of the green sheets were stacked into a multilayered structure.

The resulting 6 layered structure was fired at 1,250° C. for two hours to produce the pyroelectric ceramic multilayered body.

The firing was carried out by lifting the temperature at a rate of 2° C./minute to 500° C., and maintaining for one hour, and further, lifting to 1,250° C., and maintaining for two hours at this temperature.

Silver electrode was stoved on the polished surface of the resulting sample at a temperature of 500° C., for the measurement of the pyroelectric performance.

Separately, each of the six species of the different compositions was fired to produce a pyroelectric sample, and exerted to the pyroelectric measurement as above mentioned.

Figure 7:
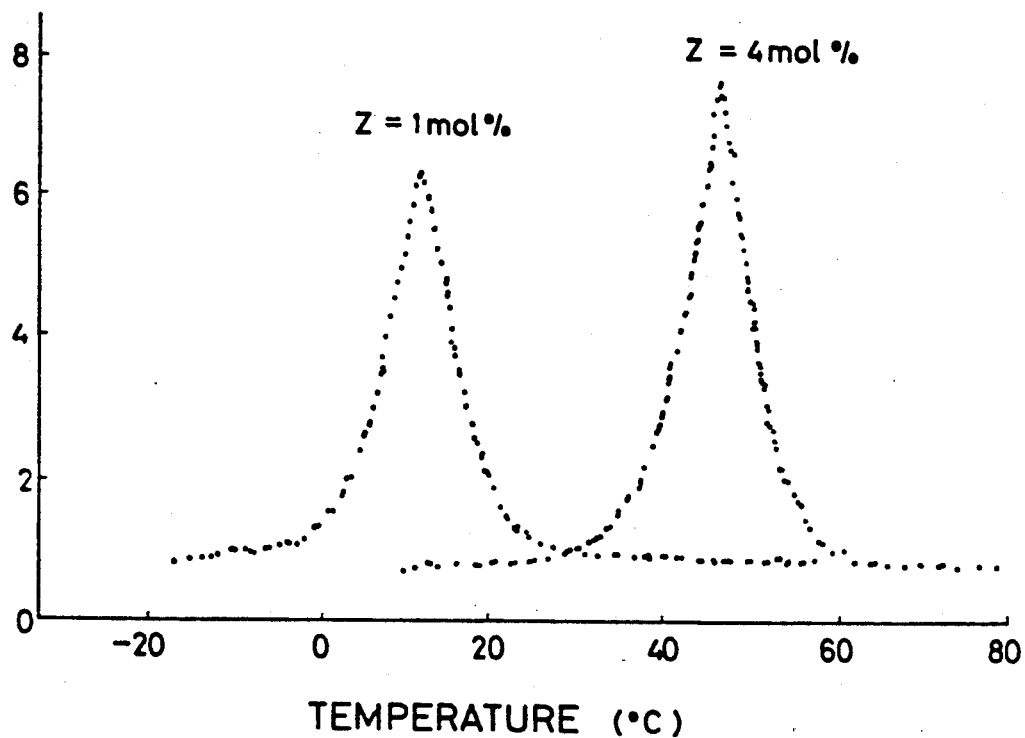
FIG. 7 is a graph in which the pyroelectric currents measured for two independent sheets having the different compositions of the above formula when Z is 0.01, and 0.04 are plotted against the temperature.

FIG. 7 shows the result of measuring on the two species of $PbZr_{0.9}(Zn_{\frac{1}{3}}Nb_{\frac{2}{3}})_{0.09}Ti_{0.01}O_3$ which corresponds to $Z=1$ mol percent, and $PbZr_{0.9}(Zn_{\frac{1}{3}}Nb_{\frac{2}{3}})_{0.06}Ti_{0.04}O_3$ which corresponds to $Z=4$ mol percent, the pyroelectric current against the temperature.

Figure 8:
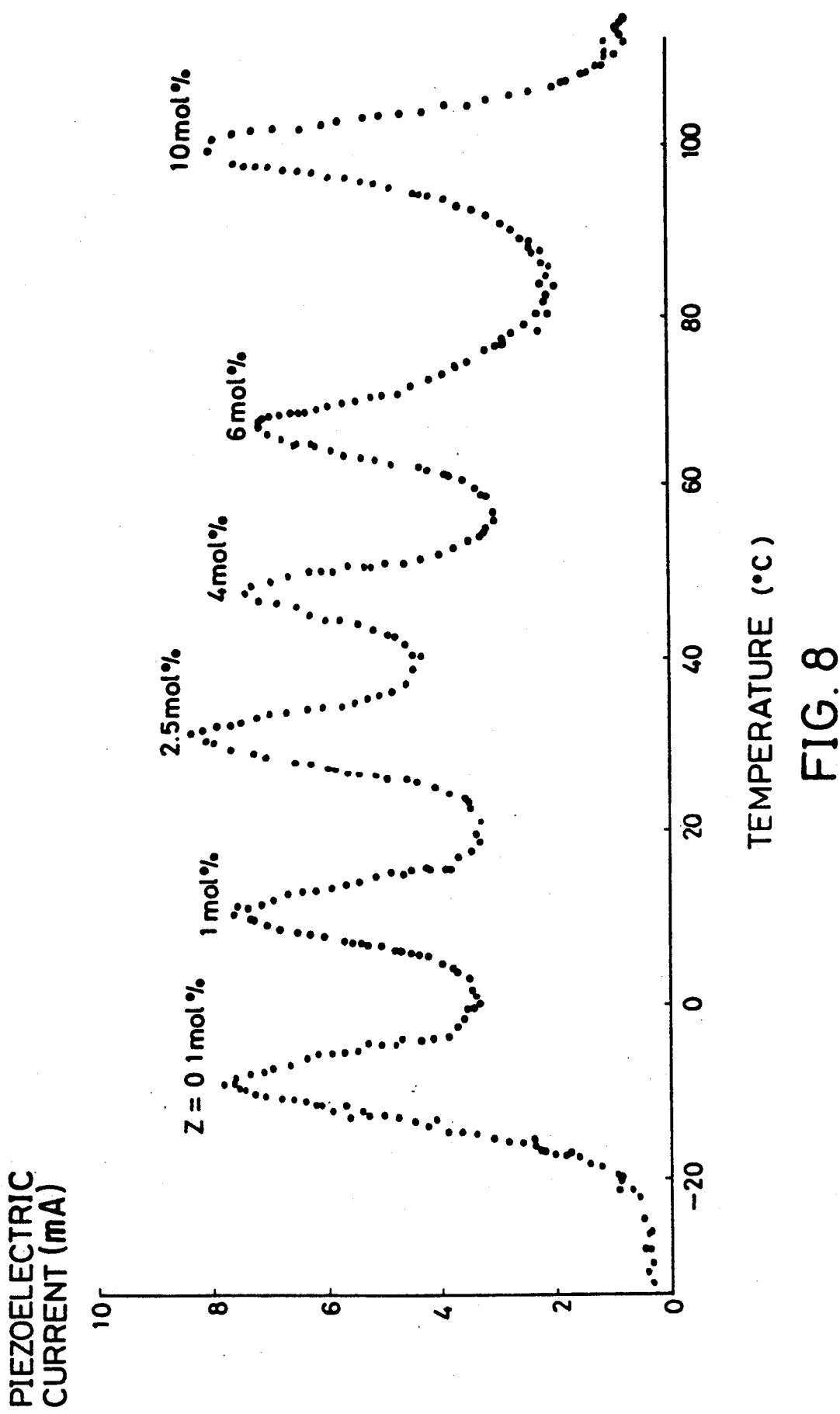
FIG. 8 is a graph in which the pyroelectric current measured by the multilayered structure of FIG. 6 A, having six different layers each of which has the compositions of the general formula: PbZr$_x$(Zn$_{\frac{1}{3}}$Nb$_{\frac{2}{3}}$)$_y$Ti$_z$O$_3$ wherein X+Y+Z=1, X=0.9 and Y=0.1−Z, when Z is 0.001, 0.01, 0.025, 0.04, 0.06 and 0.1 is plotted against the temperature.

Further, FIG. 8 is the result of the measurement of the six layer combined pyroelectric multilayered structure.

EXAMPLE 4

Preparation of Multilayered Pyroelectric Structure

A green sheet of the composition of $PbZr_{0.9}(Zn_{\frac{1}{3}}Nb_{\frac{2}{3}})_{0.09}Ti_{0.01}O_3$ i.e. when Z is 0.1 mol percent in the above mentioned formula, with the thickness of 0.01 mm, was prepared by using a doctor blade in a similar way to in Example 3. Then, a platinum paste which had been generally used for a thick printing lines and does not have glass flit was applied on the surface of the green sheet by using a screen printing technique. The green sheet was pressed at a pressing temperature of 80° C. under the pressure of 50 kg/cm$^2$ for a pressing time of 20 minutes, on the other green sheet to be stacked together as follows.

The green sheets of predetermined different compositions were formed in the same way. The predetermined compositions were corresponding to the compositions of the formula; $PbZr_X(Zn_{\frac{1}{3}Nb\frac{2}{3}})_YTi_ZO_3$ wherein $X+Y+Z=1$, and $X=0.9$, and $Y=0.1-Z$, and when Z is 0.01, 0.025, 0.04, 0.06 and 0.1 (each of which corresponds each to 1 mol percent, 2.5 mol percent, 4 mol percent, 6 mol percent, and 10 mol percent. Then, conductive electrodes were each on the surfaces of each the green sheet formed as shown in FIG. 4.

Then, each of the green sheet was fired at 1,250° C. for two hours, and each of the fired pyroelectric sheet was measured on the pyroelectric current upon the application of the potential at 1 M Hz.

Next, the above-mentioned six green sheets were pressed together in the above-mentioned condition to be stacked into a multilayered structure.

The resulting 6 layered structure was fired at 1,250° C. for two hours to produce the pyroelectric ceramic multilayered body. The firing was carried out by lifting the temperature at a rate of 2° C./minute to 500° C., and maintaining for one hour, and further, lifting to 1,250° C., and maintaining for two hours. The resulting multilayered structure was measured on the pyroelectric current upon the application of the potential at 1M Hz. The result is shown in FIG. 9.

It was found that the pyroelectric ceramics prepared from a green sheet formed by using a doctor blade has the similar performance to that of the pyroelectric ceramics prepared from a molded form.

Figure 9:
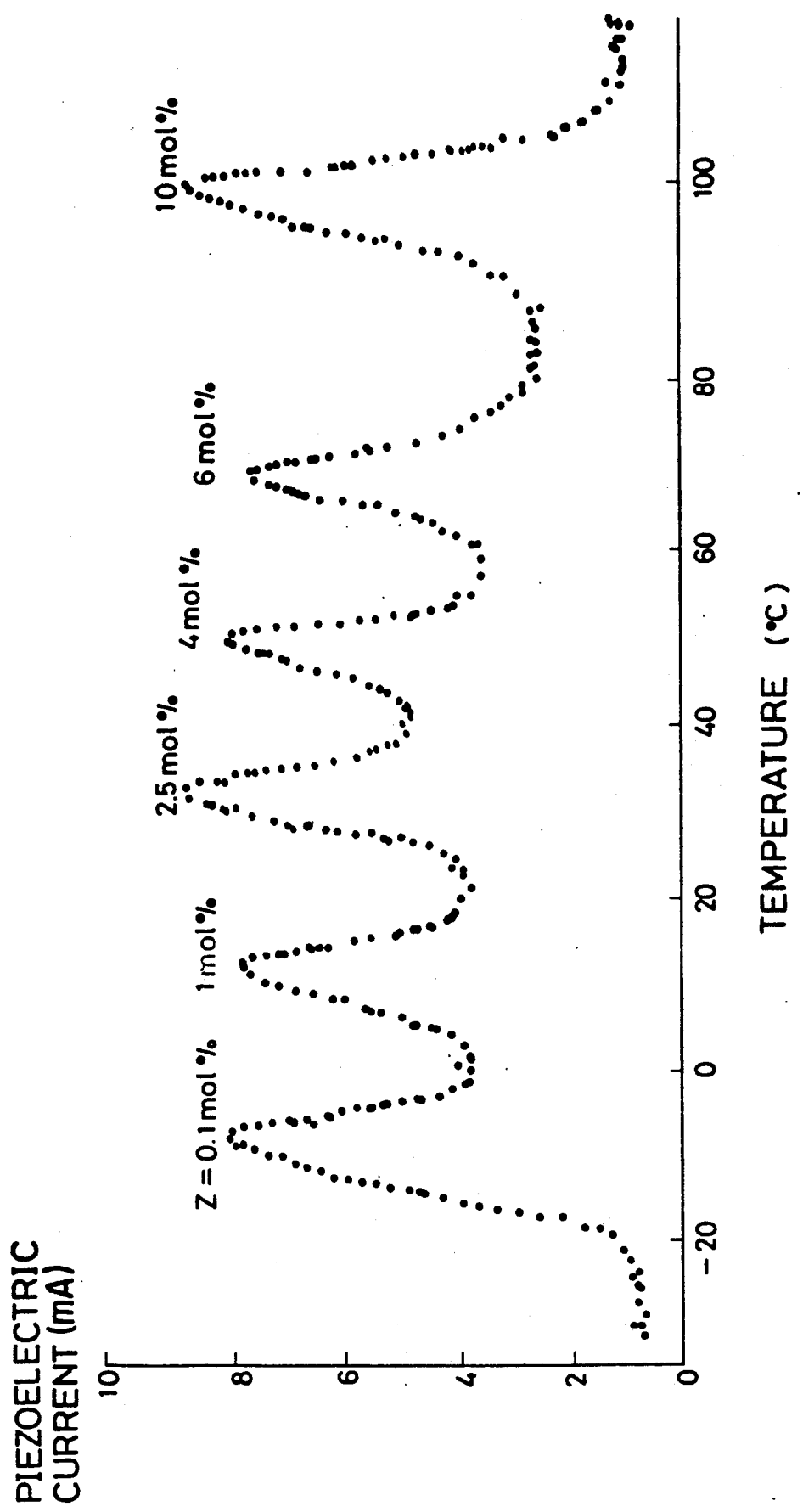
FIG. 9 is a graph in which the pyroelectric current measured by the multilayered structure of FIG. 6 B, having six different layers each of which has the compositions of the general formula: PbZr$_x$(Zn$_{\frac{1}{3}}$Nb$_{\frac{2}{3}}$)$_y$Ti$_z$O$_3$ wherein X+Y+Z=1, X=0.9 and Y=0.1−Z, when Z is 0.001, 0.01, 0.025, 0.04, 0.06 and 0.1 is plotted against the temperature.

As shown in FIGS. 8 and 9, the multilayered pyroelectric structures have the similar temperature dependency of pyroelectric currents to that of the combination of the discrete fired pyroelectric sheets. That is, The inventive multilayered pyroelectric structure will provide the second transition temperatures over the wide range of minus 10° C. to 100° C., while the pyroelectric current will be generated therein and has a maximum value at the second transition temperature. Therefore, This could not be expected from the prior art pyroelectric material. The inventive pyroelectric composition will provide a stable and flat pyroelectric current with high level, over the wide range of minus 10° C. to 100° C. Accordingly, a significantly high level of pyroelectric performance can be obtained. When the inventive composition is used to assemble a pyroelectric sensor to detect an infrared radiation, the sensor can be easily miniaturized, and further the sensor can not be affected by an environmental condition such as the circumference temperature. Then, when the sensor is used to detect uncontanctually the temperature at the long distance from the sensor under a severe condition, the inventive pyroelectric material will be useful or can be adopted to detect with appropriate sensitivity.

The reason why such significant effect can be obtained by the inventive pyroelectric composition may be considered as follows:

Generally speaking, when the materials having the similar compositions, being contacted together in combination are fired, particularly the compositions containing liquidable substances such as lead and bismuth, the particles having the similar compositions, being contacted in the combined materials will produce a solid solution at the interface between the particles. Therefore, in such case, the characteristics of the fired combined materials would not have mostly the same as the total combination of the characteristics of the discrete materials.

However, in the inventive pyroelectric multilayered structure, the total characteristics thereof would evidence the total combination of each characteristics of the discrete pyroelectric sheets each of which has respectively the different composition. In the preparation of the inventive multilayered structure, each of the composition components was previously fired to produce a firmly fired substance having stable chemical structure, which was again milled, and then, the milled material was used to form a shape, which was stacked and fired. Therefore, a reaction at the interface between the particles to produce a solid solution phase would be minimized or controlled.

Such effect was seen in Example 4. In the preparation of the multilayered structure of Example 4, several species of green sheets each of which has the different compositions were formed and a fritless platinum past was applied on the polished surface(s) of the green sheets by printing technique, and the sheets with platinum past coatings were stacked, and fired. The platinum paste coating would generally not react, and therefore, in the stacked structure, the reaction between the sheets adjacently stacked would not take place because the platinum paste coating insulates or isolates the green sheets adjacently stacked. Therefore, the reaction to produce a solid solution phase would be controlled.

In such preparation of the inventive multilayered structure, a preparatory firing step is not so necessary, only enough mixing of the components should be carried out.

Further, the other paste such as silver paste, gold paste, palladium paste and the combination thereof can be used in place of platinum paste, whereas the used paste provides less reactivity or unreactivity.

In Example, multiple green sheets with platinum paste were stacked, but the other process for the fabrication of the multilayered structure can be used, e.g. the layering by printing technique such as screen printing can be used.

It is clear that when the inventive pyroelectric composition is used in an infrared sensor, the device can be miniaturized, and can be used in the wider range of the measuring temperature, with high sensitivity.

As described in the foregoings, the inventive ceramic pyroelectric composition will enable to miniaturize the device to detect an infrared radiation or a temperature at the position apart from the device. Further, the inventive ceramic pyroelectric composition can enable to facilitate the miniaturized detector.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraces therein.

We claim;

1. A multilayered pyroelectric structure comprising a stack of a plurality of layers, each of which has the different composition each to other, of the general formula: $PbZr_x(Zn_{\frac{1}{3}Nb\frac{2}{3}})_yTi_zO_3$ wherein $X+Y+Z=1$, where the value of Z is different from each other in the different layers and having a high pyroelectric constant and a second transition temperature below its Curie's temperature.

2. The multilayered structure is claimed in claim 1 wherein X equals to 0.1.

3. The multilayered structured as claimed in claim 1 wherein X equals 0.1, $Y=0.1-Z$ where $0 \leq Z \leq 0.1$.

* * * * *